United States Patent [19]

Sato et al.

[11] 4,202,584
[45] May 13, 1980

[54] ANTI-SKID BRAKE CONTROL DEVICE AND ASSOCIATED METHOD

[75] Inventors: Makoto Sato, Kamifukuoka; Hiroshi Takamatsu, Ohimachi; Yoshitaka Miyagawa, Kawagoe; Etsuo Fujii, Wako, all of Japan

[73] Assignee: Honda Giken Kogyo Kabushiki Kaisha, Tokyo, Japan

[21] Appl. No.: 871,187

[22] Filed: Jan. 20, 1978

Related U.S. Application Data

[62] Division of Ser. No. 762,782, Jan. 25, 1977, Pat. No. 4,129,342.

[30] Foreign Application Priority Data

Jan. 29, 1976 [JP] Japan .................................... 51-8682
Feb. 2, 1976 [JP] Japan .................................... 51-10195
Feb. 16, 1976 [JP] Japan .................................... 51-15607

[51] Int. Cl.² ............................................. B60T 8/08
[52] U.S. Cl. ............................. 303/105; 188/181 A; 303/110; 303/119
[58] Field of Search ..................... 303/93, 94, 97, 105, 303/110, 111, 115, 116, 117, 119, 10; 188/181 A

[56] References Cited

U.S. PATENT DOCUMENTS

| 3,467,444 | 9/1969 | Leiber | 303/105 |
| 3,550,966 | 12/1970 | Leiber | 303/119 |
| 3,744,852 | 7/1973 | Riordan | 303/117 |

*Primary Examiner*—Reinhard J. Eisenzopf
*Attorney, Agent, or Firm*—Haseltine, Lake & Waters

[57] ABSTRACT

An anti-skid brake control device and associated method in which the device includes a wheel cylinder having defined therein a first hydraulic chamber connected with a brake fluid line extending from the master cylinder and a second hydraulic chamber connected with a pressure controlling fluid circuit. As the brake fluid line is isolated from the pressure controlling circuit by the output member of the wheel cylinder, the brake system can operate effectively, though in a conventional manner, should oil leakage occur in the controlling circuit. On a four-wheeled vehicle, each pair of front or rear wheel cylinders can be served by a common arrangement of such pressure controlling circuit for anti-skid control.

2 Claims, 3 Drawing Figures

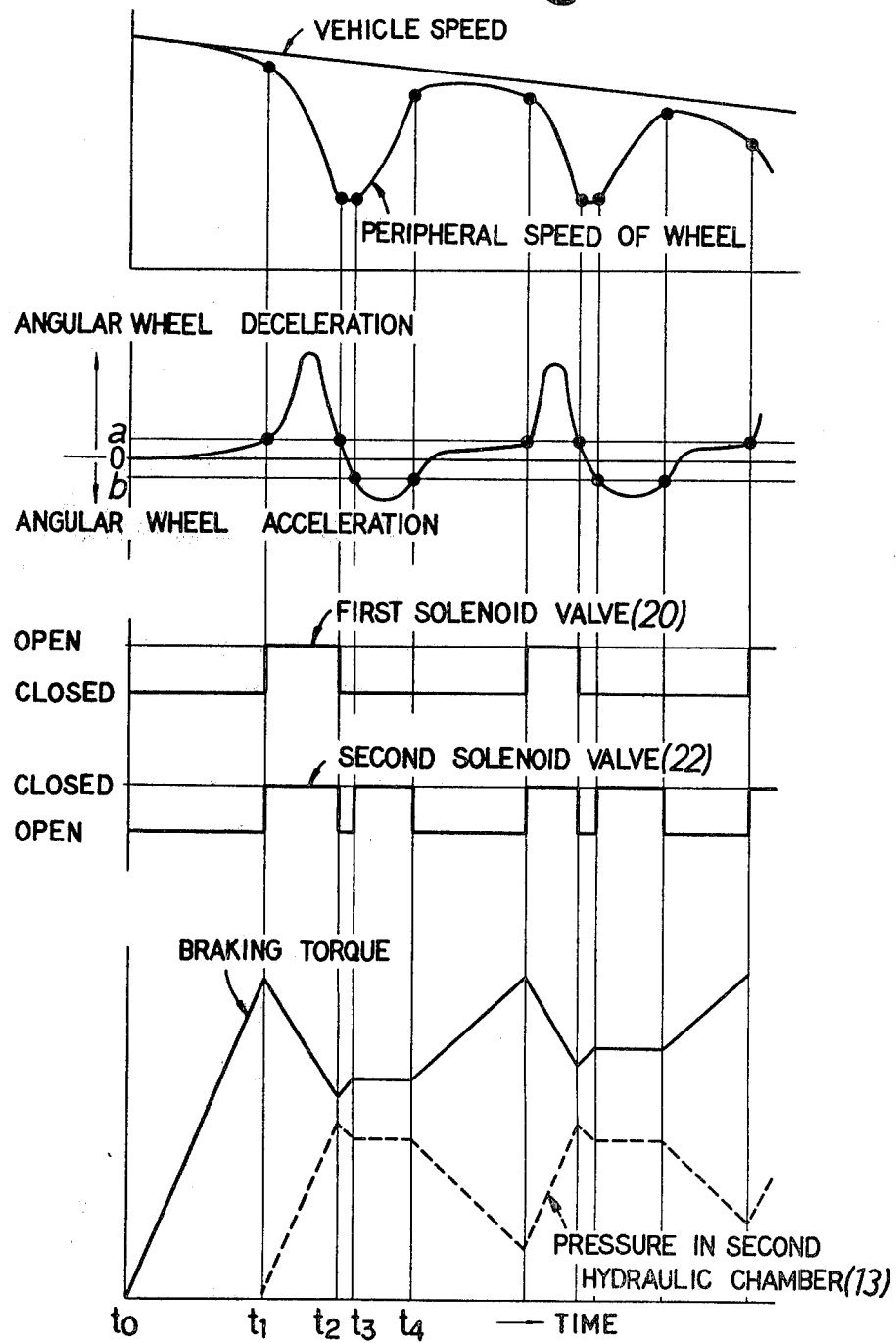

ANTI-SKID BRAKE CONTROL DEVICE AND ASSOCIATED METHOD

CROSS-RELATED APPLICATION

This application is a division of Ser. No. 762,782 filed Jan. 25, 1977 and issued Dec. 12, 1978 as U.S. Pat. No. 4,129,342.

BACKGROUND OF THE INVENTION

This invention relates generally to brake systems and associated methods for use with wheeled vehicles and more particularly to anti-skid brake control devices and associated methods which are designed to automatically reduce the braking torque as exerted on the wheels when the danger of wheel locking is imminent so that the vehicle can be braked efficiently at all times without causing any skidding of the wheels.

Previously known forms of anti-skid brake control devices are generally designed so that the brake fluid lines interconnecting the pressure output chamber of the brake fluid pressure producing unit, which is actuated by a brake pedal, and the hydraulic pressure receiving chambers of the brake assemblies, mounted at the respective vehicle wheels, are momentarily closed to reduce the pressure in these chambers when the danger of wheel locking is imminent.

With such anti-skid brake control device, however, there is the danger that the hydraulic pressure in the brake fluid lines could fail and render the brake system ineffective should oil leakage occur in the controlling fluid circuit of the device, which is arranged in connection with the brake fluid lines.

SUMMARY OF THE INVENTION

The present invention is intended to overcome the difficulties previously encountered as described above and has for its object the provision of a new and improved anti-skid brake control device and method for use with wheeled vehicles which is designed to minimize the danger of brake failure as resulting from leakage of hydraulic fluid.

Another object of the present invention is to provide an anti-skid brake control device and method of the character described which is simplified in structure and inexpensive.

The above and other objects and advantages of the present invention will become apparent from the following detailed description when taken in conjunction with the accompanying drawings.

BRIEF DESCRIPTION OF THE DRAWINGS

In the drawings:

FIG. 3 is a characteristic diagram of the command system of the present invention.

DESCRIPTION OF THE PREFERRED EMBODIMENTS

Figure 1:
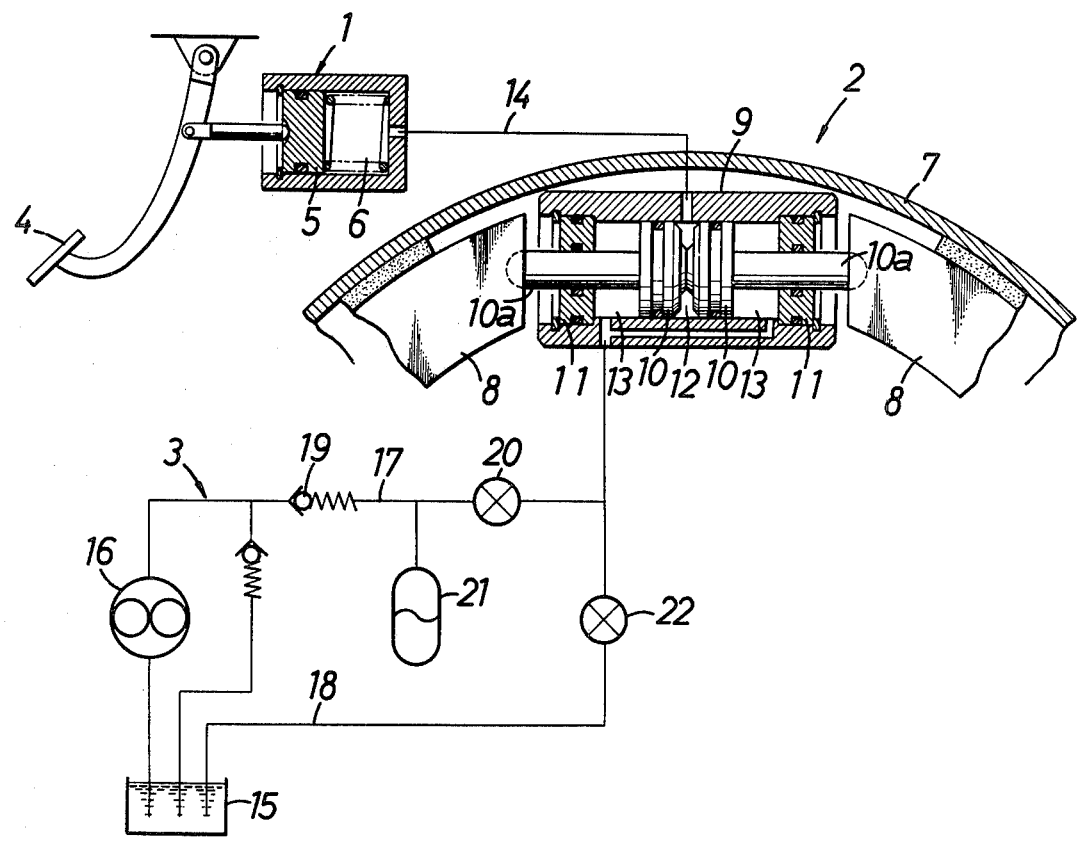
FIG. 1 is a partial schematic illustration of the system of the present invention.

Referring first to FIG. 1, which illustrates a form of anti-skid brake control device embodying the present invention, reference numeral 1 generally indicates a brake fluid pressure producing unit; 2 indicates a brake mechanism operable under the pressure output of the fluid pressure producing unit 1 and equipped at each of the vehicle wheels; and 3 indicates a control system provided to feed the brake mechanism 2 with a hydraulic pressure which counteracts the output fluid pressure of the unit 1 to control the braking torque, which the brake mechanism 2 exerts upon the associated wheel. A description will next be made of the construction of these components in order.

The brake fluid pressure producing unit 1 takes the form of a brake master cylinder of well-known construction, which includes a pressure output chamber 6 filled with hydraulic oil and a piston 5 connected with a brake pedal 4 and operable to compress the chamber 6 to produce a desired hydraulic pressure output.

The brake mechanism 2, of the oil hydraulic form, is comprised of a brake drum 7 fixed to the wheel for rotation therewith, a pair of brake shoes 8—8 floatingly or rockably supported inside of the brake drum on a fixed panel, not shown, and a wheel cylinder 9 interposed between the movable end portions of the respective brake shoes 8-8. Slidably fitted in the wheel cylinder 9 are a pair of opposed output pistons which are formed integral with respective piston rods 10a—10a connected with the movable end portions of the brake shoes 8—8. In this manner, there is provided a first hydraulic chamber 12 between the two output pistons 10 with a pair of second hydraulic chambers 13—13 defined between each of the output pistons 10—10 and the adjacent one of end wall members 11—11 secured to the wheel cylinder 9 at its opposite open ends. As shown, the first hydraulic chamber 12 is in fluid communication with the pressure output chamber 6 of the brake master cylinder 1 by way of a brake fluid line 14.

As shown, the control system 3 includes an oil reservoir 15, an oil pressure source pump 16 having a suction port opening into the oil reservoir 15, a high-pressure oil line 17 extending from the delivery port of oil pump 16, and a low-pressure oil line 18 opening at one end into the oil reservoir 15. Both the high-pressure and low-pressure oil lines 17 and 18 are connected at the other end to the pair of second hydraulic chambers 13—13. Inserted in the high-pressure oil line 17 are a non-return valve 19 and a first control valve in the form of a normally-closed solenoid valve 20, which is arranged on the downstream side of non-return valve 19, with an accumulator 21 connected with the oil line 17 between the valves 19 and 20. Inserted in the low-pressure oil line 18 is a second solenoid valve 22, which is a normally-open control valve.

Figure 2:
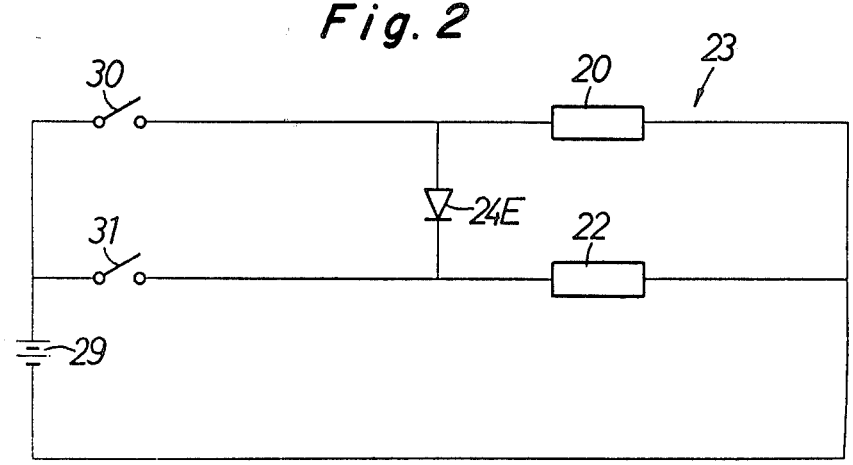
FIG. 2 is an electric circuit diagram of a modified form of command system employed with FIG. 1.

Reference will next be had to FIg. 2, which illustrates another form of command system 23 which is most simplified in construction. As observed, the first and second sensor switches 30 and 31 are inserted in the respective lines connecting the coils of the first and second solenoid valves 20 and 22 to the battery 29 in parallel with each other, with a diode 24E arranged across the lines on that side of the two sensor switches 30 and 31 remote from the battery 29. The first sensor switch 30 is arranged to close upon sensing the angular deceleration of the wheel as braked by the brake mechanism 2 when the wheel deceleration exceeds a preset threshold value a. Similarly, the second sensor switch 31 is so arranged as to close upon sensing the angular acceleration of the wheel when it exceeds a preset threshold value b.

Description will next be made of the operation of this embodiment with reference to the characteristic diagram of FIG. 3.

In the event the brake pedal 4 is depressed to activate the brake master cylinder 1 during vehicle travel at the point of time $t_0$, output fluid pressure of the brake master cylinder 1 is transmitted to the first hydraulic chamber 12 of wheel cylinder 9 to force the pistons 10—10 outwardly apart from each other, so that the brake shoes 8—8 are pressed against the internal surface of brake drum 7, thus exerting upon the wheel a braking torque corresponding to the oil pressure fed to the first hydraulic chamber 12.

As the braking torque increases, the angular deceleration of the wheel increases and, when the danger of the wheel being locked is imminent, that is, at the instant when the angular wheel deceleration has reached the preset value a, the first sensor switch 30 closes to energize the coils of the two solenoid valves 20 and 22 and thus the normally closed, first solenoid valve 20 opens while the normally open, second solenoid valve 22 closes so that the high-pressure and low-pressure fluid lines 17 and 18 are placed respectively in and out of fluid communication with the pair of second hydraulic cahbmers 13—13 of wheel cylinder 9, which are thus fed with oil pressure from the oil pump 16 or accumulator 21. The oil pressure thus built up in the second hydraulic chambers 13—13 counteracts the oil pressure fed to the first hydraulic chamber 12. In this manner, the braking torque is reduced with increase in oil pressure in the second hydraulic chambers 13—13 and the danger of wheel locking is precluded.

The angular deceleration of the wheel decreases with a decrease of the braking torque and, at the point of time $t_2$ at which the wheel deceleration again reaches a preset threshold value a, the first sensor switch 30 again opens and the two solenoid valves 20 and 22 are both restored to their normal position, placing the low-pressure and high-pressure fluid lines 18 and 17 respectively in and out of fluid communication with the pair of second hydraulic chambers 13—13. Accordingly, the oil pressure in these hydraulic chambers 13—13 starts to decrease, causing the braking torque again to rise. The angular deceleration of the wheel, still continuing to decrease owing to the delay in operation of the brake mechanism 2, soon disappears and is succeeded by angular acceleration of the wheel. Subsequently, when the wheel acceleration reaches a preset threshold value b at $t_3$, this time the second sensor switch 31 closes, sensing the acceleration value, and only the coil of second solenoid valve 22 is energized, the coil of first solenoid valve 20 remaining de-energized because of the presence of diode 24E. Upon closing of the second solenoid valve 22, which is in the low-pressure fluid line 18, reduction in pressure in the second hydraulic chambers 13—13 of wheel cylinder 9 is interrupted, that is, the oil pressure in the two chambers 13—13 is fixed at a definite level. As the result, the output pistons 10—10 are hydraulically locked to maintain the magnitude of the braking torque at a definite level irrespective of the pressure output of the brake master cylinder 1.

Subsequently, as the peripheral speed of the wheel approaches the vehicle speed, the angular acceleration of the wheel begins to decrease and returns to the preset value b at time $t_4$, when the peripheral velocity of the wheel comes fully close to the vehicle speed. At the same time, the second sensor switch 31 opens to restore the second solenoid valve 22 to its open position and the low-pressure fluid line 18 is placed in communication with the pair of second hydraulic chambers 13—13 so that the oil pressure in the latter again begins to decrease, causing the braking torque to rise. Thereafter, substantially the same process as that described above is repeated, as shown in the diagram. To summarize, in this braking operation, the braking torque exerted upon the wheel begins to decrease when the angular deceleration of the wheel exceeds a preset threshold value with an excess of braking operation and then begins to increase again when the wheel deceleration is reduced below the preset value. Subsequently, when the angular acceleration of the wheel, succeeding the wheel deceleration, exceeds a preset threshold value, the braking torque ceases to increase to maintain a definite value. It will be appreciated, therefore, that with this command system any excessive reduction in braking torque as resulting from delay in operation of the brake mechanism is effectively avoided, and the braking torque can be kept at a definite level effective for proper braking operation for a time after the angular acceleration of the wheel has reached the preset threshold value and the danger of the wheel being locked has disappeared. Further, when the angular acceleration of the wheel is subsequently reduced below its preset threshold value, the braking torque begins again to rise above the definite level referred to above. It will be appreciated, therefore, that, with this command system, the width of variation in braking torque value from its bottom to its peak and hence the length of time required for the torque rise to the peak value can be effectively reduced; in other words, the braking torque can be rapidly restored for effective braking operation without causing any substantial vibration to the vehicle. This not only eliminates the danger of impairing the driver's feeling in braking operation but also improves the braking efficiency, enabling reduction in braking distance of the vehicle.

To summarize, in this embodiment of the present invention, the hydraulic brake mechanism associated with each of the vehicle wheels is provided with a first hydraulic chamber defined on one side of the operating member such as an output piston and placed in fluid communication with a hydraulic pressure producing unit such as a brake master cylinder and a second hydraulic chamber defined on the other side of the operating member. In the braking operation, the second hydraulic chamber is fed with a fluid pressure effective to counteract the one acting in the first hydraulic chamber in order to reduce the braking torque when the danger of wheel locking is imminent, whereby the vehicle can be braked with good efficiency without causing any wheel skidding. Moreover, even if oil leakage occurs in the oil control circuit connected with the second hydraulic chamber, there is no danger of the brake oil leaking out of the brake fluid circuit including the brake master cylinder since the brake fluid circuit is isolated from the oil control circuit by the operating member of the brake mechanism. This enables the anti-skid brake system to operate effectively, though in a conventional manner, despite such oil leakage in the oil control circuit, thus giving a particularly high reliability to the system.

Though a few preferred embodiments of the present invention have been shown and described, it will be apparent to those skilled in he art that various changes and modifications may be made therein without departing from the spirit of the invention or from the scope of the appended claims.

What is claimed is:

1. In a brake system for use with wheeled vehicles including a brake fluid pressure producing unit, an anti-skid brake control device comprising:

an oil-hydraulic brake mechanism associated with a vehicle wheel and including an operating member, a first hydraulic chamber defined on one side of said operating member for hydraulically driving the latter, and a second hydraulic chamber defined on the opposite side of said operating member to apply thereon an oil-hydraulic pressure counteracting the oil-hydraulic pressure applied to said operating member on said one side thereof, said first hydraulic chamber being held in fluid communication with said brake fluid pressure producing unit;

a source of fluid pressure;

a high-pressure fluid line extending between said second hydraulic chamber in said brake mechanism and said source of fluid pressure;

an oil reservoir;

a low-pressure fluid line extending between said second hydraulic chamber in said brake mechanism and said oil reservoir;

fluid control valve means inserted in said high-pressure and low-pressure fluid lines; and command system means connected with said fluid control valve means for effecting a repeated braking process in which the braking torque as applied to the wheel begins to decrease when the angular deceleration of the wheel exceeds a predetermined threshold valve, then begins to increase when the angular wheel deceleration decreasing with decrease in the braking torque is reduced below said predetermined threshold value, is subsequently held at a definite level during the period of time that the angular acceleration of the wheel arising upon disappearance of the angular wheel deceleration is held above a predetermined threshold value, and finally begins again to rise when the angular acceleration of the wheel falls below its said predetermined threshold value.

2. An anti-skid brake control method adapted for use with a wheeled vehicle, said method comprising the steps of: decreasing a braking torque as applied to a wheel when an angular deceleration of said wheel exceeds a first predetermined threshold value; increasing the braking torque when the angular wheel deceleration, decreasing with decrease in the braking torque, is reduced below said first predetermined threshold value; holding the braking torque at a definite level during the period of time in which the angular acceleration of the wheel, increasing upon disappearance of the angular wheel deceleration, remains above a second predetermined threshold value; increasing the braking torque when the angular acceleration of the wheel falls below said second predetermined threshold value; and repeating the above-described sequence of steps until the vehicle is stopped.

* * * * *